UNITED STATES PATENT OFFICE.

CHARLES E. ANTHONY, OF DENVER, COLORADO, ASSIGNOR, BY MESNE ASSIGNMENTS, TO THE WESTERN ELATERITE MANUFACTURING COMPANY, OF COLORADO.

PAINT.

SPECIFICATION forming part of Letters Patent No. 616,047, dated December 13, 1898.

Application filed December 24, 1896. Serial No. 616,937. (No specimens.)

*To all whom it may concern:*

Be it known that I, CHARLES E. ANTHONY, a citizen of the United States of America, residing at Denver, in the county of Arapahoe and State of Colorado, have invented certain new and useful Improvements in Processes for the Manufacturing of Elaterite Paints and Enamels; and I do declare the following to be a full, clear, and exact description of the invention, such as will enable others skilled in the art to which it appertains to make and use the same.

This invention is an improvement in painting and enameling compounds; and its object is to produce a durable, brilliant, elastic, and waterproof paint and enameling compound; and it consists in the combinations of ingredients hereinafter described and claimed.

One of the ingredients of the composition is itself a new product of my invention and is made the subject of a separate application. This product is produced by heating wurtzilite to a predetermined high temperature—say 600° Fahrenheit—in a closed retort, whereby it is rendered soluble and fusible, whereas the crude material does not possess such properties.

In making my improved painting and enameling compound I take this wurtzilite product and dissolve it in turpentine or benzin to the consistency of ordinary paint, so that it can be applied with a brush, and color the same by adding any desired pigment. This compound forms a fine paint of itself or a base for mixture with other paints or varnishes.

For enameling I add to the dissolved wurtzilite product sulfid of antimony or other suitable sulfid of metal, such as are commonly used for vulcanizing purposes, and add any suitable pigment to give the enamel the desired color. The surface to be enameled is coated with the composition and then baked in the ordinary manner until the composition is vulcanized. A temperature of about 500° Fahrenheit will vulcanize the enamel in about thirty minutes. The resulting finished enamel coating is insoluble in turpentine, naphtha, benzin, and similar solvents, and very brilliant and lasting.

Having thus fully described my invention, what I claim as new, and desire to secure by Letters Patent of the United States, is—

1. The herein-described compound, consisting of the specified wurtzilite product, and a suitable solvent, substantially as described.

2. The herein-described compound, consisting of the specified wurtzilite product, a suitable solvent, and a pigment, substantially as specified.

3. The herein-described painting and enameling compound consisting of the specified wurtzilite product, a suitable solvent, and a metallic sulfid, substantially as described.

4. The herein-described painting and enameling compound consisting of the specified wurtzilite product, turpentine, pigment, and sulfid of antimony, substantially as described.

In testimony whereof I affix my signature in presence of two witnesses.

CHARLES E. ANTHONY.

Witnesses:
ISHAM R. HOWZE,
O. BURNETT.